United States Patent [19]
White

[11] Patent Number: 6,022,437
[45] Date of Patent: Feb. 8, 2000

[54] METHOD OF APPLYING OUTWARDLY DISPOSED IMAGES TO THE INTERIOR SURFACES OF TRANSPARENT ENCLOSURES WITH LIMITED INTERIOR ACCESS

[76] Inventor: Anita A. White, 2949 Delaware St., Fayetteville, N.C. 28304

[21] Appl. No.: 08/873,866

[22] Filed: Jun. 12, 1997

Related U.S. Application Data

[60] Provisional application No. 60/019,457, Jun. 13, 1996.

[51] Int. Cl.[7] .......................... A47G 33/08; B29C 63/30; B29C 65/52
[52] U.S. Cl. .......................... 156/212; 156/293; 156/423; 156/DIG. 5; 156/DIG. 42; 428/11
[58] Field of Search ...................... 156/212, 214, 156/293, 294, 423, DIG. 5, DIG. 6, DIG. 8, DIG. 9, DIG. 37, DIG. 42; 428/11

[56] References Cited

U.S. PATENT DOCUMENTS

| | | | |
|---|---|---|---|
| Re. 23,668 | 6/1953 | Von Hofe | 156/423 |
| 1,725,199 | 8/1929 | Kuhn et al. | 156/249 |
| 3,440,128 | 4/1969 | Kubilius | 428/11 |
| 3,802,104 | 4/1974 | Wiley | 40/152 |
| 4,173,667 | 11/1979 | Rusch | 428/11 |
| 4,285,746 | 8/1981 | DePuy | 156/79 |
| 4,309,464 | 1/1982 | Rauch | 428/11 |
| 4,337,105 | 6/1982 | Stachiw et al. | 156/293 |
| 4,592,936 | 6/1986 | Ferguson | 428/11 |
| 4,884,827 | 12/1989 | Kelley | 156/DIG. 5 |
| 4,889,748 | 12/1989 | Dudley | 428/11 |
| 4,909,882 | 3/1990 | Sze | 156/240 |
| 4,996,087 | 2/1991 | Rebstock | 428/11 |
| 5,175,029 | 12/1992 | Peterson | 428/34 |
| 5,378,512 | 1/1995 | Van Wyk | 428/11 |
| 5,458,930 | 10/1995 | Brown | 156/293 |
| 5,690,783 | 11/1997 | Meyers et al. | 156/423 |
| 5,733,409 | 3/1998 | Turnbull et al. | 156/423 |

*Primary Examiner*—Steven D. Maki
*Attorney, Agent, or Firm*—Mills Law Firm PLLC

[57] ABSTRACT

A method of applying outwardly disposed images to the interior surfaces of transparent and opaque enclosures with limited interior access includes preparing the image to be interiorally mounted in the enclosure, at least partially rolling the image, inserting the rolled imaged through the access, unrolling the image, and adhering the image to the inside surface of the enclosure with liquid adhesive.

9 Claims, 2 Drawing Sheets

METHOD OF APPLYING OUTWARDLY DISPOSED IMAGES TO THE INTERIOR SURFACES OF TRANSPARENT ENCLOSURES WITH LIMITED INTERIOR ACCESS

CROSS-REFERENCE TO RELATED APPLICATION

This application claims the benefit under 35 USC 119(e) of U.S. Provisional Application No. 60/019,457 filed Jun. 13, 1996 by Anita A. White for "Method of Applying Outwardly Disposed Images to the Interior Surfaces of Transparent and Opaque Enclosures with Limited Interior Access.

FIELD OF THE INVENTION

The present invention to a method for applying decorative images to the interior surfaces of enclosures.

BACKGROUND OF THE INVENTION

Prior to the present invention, many approaches have been disclosed in patents regarding methods of placing images on ornaments.

For example, U.S. Pat. No. 4,996,087 discloses a method of making decorative ornaments wherein a coating having acrylic resin is applied to the exterior and then a one-color outline of the design is printed on the acrylic resin coating. The space formed within the outline of the design serves as a coloring space for an individual to create a personalized ornament.

U.S. Pat. No. 4,909,882 to Sze discloses a method of applying a cellophane decal to the inside wall of a transparent container wherein a hand cannot directly reach into contact. This art consists chiefly of filling the container to be decorated with a liquid, inserting a decal cellophane which is lined with a backing paper into the container, removing the paper backing from the container, draining the liquid away from the container, and then baking the container to affix the design.

U.S. Pat. No. 4,996,087 to Rebstock discloses a method of making decorative ornaments of a personalized nature wherein a 3-dimensional ornament is covered by a coating having acrylic resin and then a one-color outline of the design is printed on the coating and the exterior of the ornament.

U.S. Pat. No. 4,285,746 to DePuy et al. discloses a method of decorating seasonal ornaments wherein a tubular band of pre-decorated heat shrinkable material is positioned over the bulbous portion of a seasonal ornament and the ornament-band assembly is subjected to a heat source permanently shrinking the band into the outer surface of the ornament to provide a surface decoration.

U.S. Pat. No. 5,378,512 to Van Wyk discloses an ornament including a hollow ornament body having an inner surface coating layer in which a decorative pattern is formed for the ornament. The pattern in the inner coating layer is formed by directing a laser beam through the hollow ornament body into the inner coating layer in a predetermined pattern. When illuminated from within, the ornament produces a unique appearance due to the removal of the inner coating layer.

U.S. Pat. No. 4,173,667 to Rusch discloses a kit for making a Christmas ornament including a pair of transparent hemispherical members lockable into confronting relation to form a transparent housing to provide an unobstructed view into the housing from opposite sides thereof. The kit also includes an ornamental article to be mounted in a predetermined position in one of the members before the other member is fitted thereover.

U.S. Pat. No. 5,175,029 to Peterson discloses a Christmas tree ornament formed of three transparent plastic parts, a top member, a bottom member and an internal member. The ornament is intended to be sold in kit form whereby the owner may mount his own photographs on the internal member and then seal the internal member within the top and bottom member before hanging the ornament on a Christmas tree.

U.S. Pat. No. 4,889,748 to Roger. W. Dudley is considered of general interest in that it discloses a display device comprising rigid planar thin sheet substrate means. An envelope defined by sheets composed of transparent material and having an outer edge secured on the rigid planar sheet substrate means. A clear material is disposed over the envelope to form a transparent dome-like structure through which a commemorative postage stamp may be viewed.

U.S. Pat. No. 3,802,104 to Wiley discloses a spherical ball picture viewing device comprising a plurality of spherical transparent balls each having a flattened face portion along one side thereof. A picture is embedded into the one side face portion of each ball. A face of the picture has pictorial matter thereon directed toward the center axis of the transparent ball such that the picture will be magnified when viewed from the face of the ball opposite the flattened face portion.

SUMMARY OF THE INVENTION

A method of applying outwardly disposed images to the interior surfaces of transparent and opaque enclosures with limited interior access includes preparing the image to be interiorly mounted in the enclosure, at least partially rolling the image, inserting the rolled image through the access, unrolling the image, and adhering the image to the inside surface with liquid adhesive.

DESCRIPTION OF THE DRAWINGS

The present invention will become apparent upon reading the following detailed description of the preferred embodiments taken in conjunction with the accompanying drawings in which.

DETAILED DESCRIPTION OF THE PREFERRED EMBODIMENTS

Figure 1:
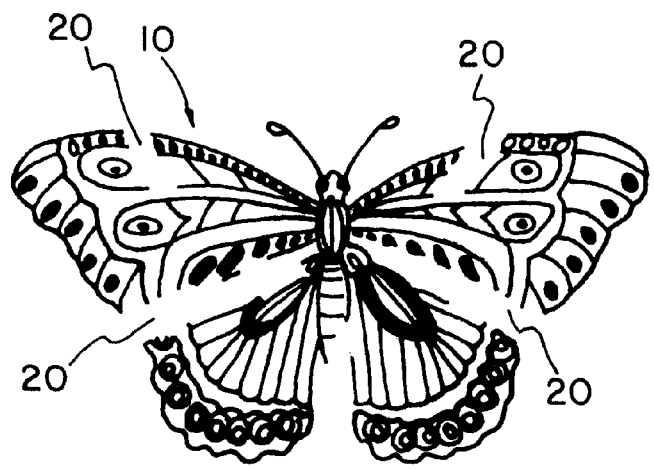
FIG. 1 is a side elevational view of an image to be applied to the interior surface of an ornament in accordance with an embodiment of the invention.

Referring to the drawings, there is shown a method for applying an image 10 to the interior surface 12 of an ornament 14. In one embodiment a stamped image is applied to the inside of a glass ornament. Therein, a rubber stamp is chosen whose dimensions are smaller than the ornament into which the stamped image will be inserted. By way of example, a 4 inch by 5 inch image will not fit into a three inch ball.

After choosing the appropriate stamp, the image is transferred onto a planar substrate such as an art tissue using pigment ink. A white tissue produces the most visible results. However, different colors may be used. A suitable ink color is ColorBox brand pigment ink.

Next the image is coated with conventional clear embossing powder. The image is heat embossed using conventional techniques. Supporting the tissue paper on a solid surface such as a sheet of card stock is recommended for the embossing. Thereafter, the embossed image is colored with water based pens. Suitable pens which are available are Tombow brand water based pens.

After coloring with the water based pens. The colored image is cut from the tissue paper. To prepare the image to fit the surface of the ornament, diagonal slices 20 are made from the edges toward the center so it will form a smooth spherical surface without wrinkles, FIG. 1. As illustrated, the image is in the form of a butterfly. Thereafter, the prepared image is placed against the outside surface 22 of the ornament to test for shaping and the need for additional cuts. When the entire prepared image is in contact wit the outside surface of the ornament, the image should appear unwrinkled and smooth, FIG. 2.

Figure 2:
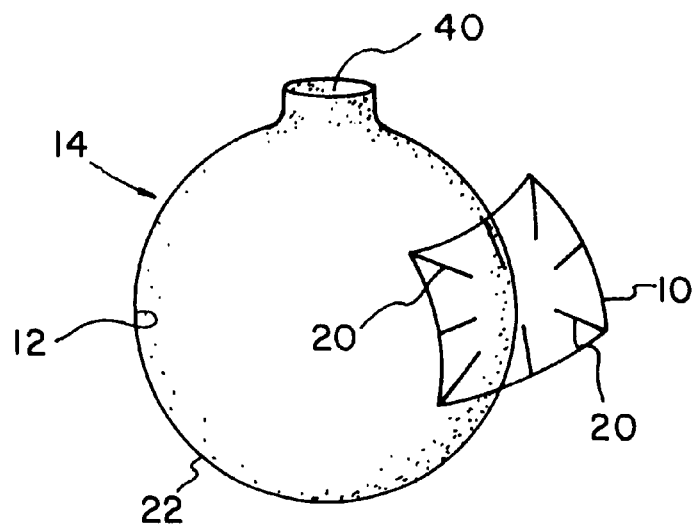
FIG. 2 is a perspective view illustrating the testing of the image for wrinkle free transfer to the interior surface of the ornament.
Figure 3:
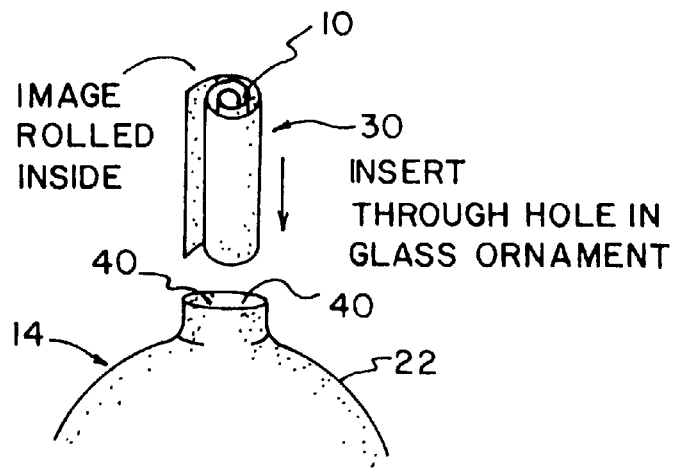
FIG. 3 is an enlarged perspective view illustrating the insertion of the image into the ornament.
Figure 4:
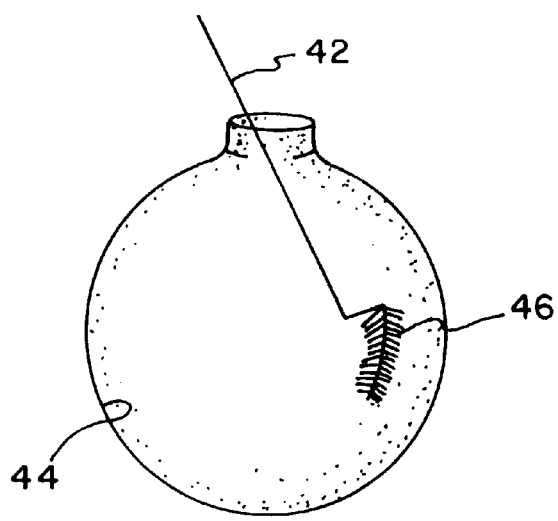
FIG. 4 is a perspective view illustrating applying an adhesive to the interior surface of the ornament.

The image as prepared above is then ready for insertion into an ornament. Preferably the ornament is clear glass. A suitable ornament is commercially available from Rauch Industries Magic Division and is illustrated in FIG. 2. Next an ornament flange is removed from the ornament and the prepared image is rolled into a cylindrical configuration so that the image is on the inside thereby protecting the image and embossing. The rolled size as illustrated in FIG. 3 is less than the opening 40 in the top of the ornament. The rolled image is then inserted inside the ornament through the opening. After the rolled image is completely inside the ornament, the rolled image is unfurled using a dry brush 42, FIG. 4. A suitable commercially available brush is Magic Bubble Brush medical cytology brush. Such a brush is preferred because it provides a combination of flexibility and stiffness effective in the process of the present invention. Other flexible brushes may be used.

After insertion and unfurling of the rolled image, the inside surface of the ornament is coated with a liquid adhesive 44. A disposable syringe, funnel and the like may be used for ease of application. A suitable commercially available adhesive is Treasure Crystal Cote brand adhesive from Plaid Enterprises, Inc. Next, the tip 46 of the brush 42 is inserted into the ornament, and used to coat both sides of the unrolled insert with the adhesive and conform the image against the inside surface of the ornament. The tip 46 of the brush is bent to conform to the interior surface of the ornament.

Thereafter, the inside of the ornament is coated with Treasure Crystal Code brand liquid adhesive and ultra-fine Prisma brand glitter is poured into the interior of the ornament and distributed over the entire inside surface of the ornament. Excess liquid and glitter is removed and the ornament allowed to dry. After drying, the ornament flange is reinstalled. The flange may be embellished with ribbons, pearls, dry flowers and the like.

In another embodiment, a similar procedure may be used to apply photographic images to the inside of a glass ornament. Therein, a photograph is reproduced on a high resolution color copier. The desired portion of the image is then cut out from the color copy. To prepare the image to fit the surface of the ornament, diagonal slices are made from the edges toward the center so that the image will form a smooth spherical surface without wrinkles. To test the sliced image for shaping and the need for additional cuts, the image is placed against the outside surface of the ornament, and should thereat be unwrinkled and smooth.

Thereafter, the ornament hanger is removed from the ornament, the prepared image is rolled so that the image is on the inside of the roll. The rolled image is inserted into the ornament through the hole in the top of the ornament. After the image is completely inside the ball, the rolled image is unfurled using the brush. Next a liquid adhesive such as Bostik Clear Glue brand adhesive is poured into the interior of the ornament to coat the inside surface completely. Thereafter, the brush is used to smooth the image to the inside of the ornament, coating both sides of the image with adhesive. As in the above described embodiment, the entire inside surface is coated with glitter, the excess liquid and glitter removed, and the ornament allowed to dry. After drying the ornament flange is reinstalled and embellished, if desired, with ribbons, pearls, dry flowers and the like.

In further embodiment, a similar procedure may be used to apply a decorative sticker to the inside of a glass ornament. Therein, the backing is removed from the sticker and the sticky side dusted with baby powder, corn starch or like material to remove the stickiness. The desired portion for the image is cut from the sticker. To prepare the image to fit the ornament, slices are made in the image from the edges toward the center so that the image will form a spherical surface without wrinkles. Next, the prepared image is placed against the outside of the ornament to test for shaping and the need for additional cuts. When in contact with the outside surface, the image should appear unwrinkled and smooth.

The prepared image is then rolled so that the image is on the inside of the roll and inserted into the interior of the ornament though the hole in the top. After the image is completely inside the ball, the rolled image is unfurled using the aforementioned brush. Next a sufficient amount of liquid adhesive is inserted to completely coat the inside surface. Using the brush, the image is smoothed to the inside of the ornament, coating the sticker on both sides with the adhesive. Thereafter, the surface is coated with adhesive and glitter as described above, excess liquid and glitter removed and the ornament allowed to dry. After drying, the ornament flange is reinstalled. The flange, if desired, may be embellished with ribbons, pearls, dry flowers and the like.

The present invention as described by the preceding embodiments is defined by the following claims.

What is claimed is:

1. A method of applying an image to an enclosure defined by a curved outer surface, a curved inner surface establishing an interior volume and a through hole extending between said inner surface and said outer surface; said method comprising the steps of:
   providing a decorative image on a planar substrate;
   preparing said substrate to conform to said inner surface;
   forming said substrate into a rolled configuration insertable through said hole;
   inserting said rolled configuration through said hole;
   unforming said rolled configuration to an unrolled configuration;
   applying a liquid adhesive to said image in said unrolled configuration; and
   adhering said image with said liquid adhesive thereon against said inner surface.

2. The method as recited in claim 1 wherein said preparing includes making incisions in said planar substrate to enable said planar substrate to be applied to and conform with said inner surface substantially without wrinkles.

3. The method as recited in claim 2 wherein said providing a decorative image on a planar surface includes imprinting said image on said planar substrate, and said preparing includes removing portions of said substrate exterior of said image.

4. The method as recited in claim 3 wherein said imprinting is stamping.

5. The method as recited in claim 4 including the step of embossing said image after imprinting.

6. The method as recited in claim 3 wherein said imprinting photographic.

7. The method as recited in claim 2 including the step of applying liquid adhesive to said inner surface after adhering said image.

8. The method as recited in claim 7 including the step of adhering decorative particulate glitter to said liquid adhesive applied to said inner surface after adhering said image.

9. A method of applying an image to a generally spherical ornament defined by a spherical outer surface, a spherical inner surface establishing a spherical interior volume and a through hole extending between said inner surface and said outer surface communicating with said interior volume; said method comprising the steps of: providing a decorative image on a planar substrate; removing portions of said planar substrate exterior of said image; making incisions through said image enabling said planar substrate to conform to said inner surface substantially without wrinkling; rolling said substrate into a cylindrical configuration insertable through said hole; inserting said cylindrical configuration through said hole; unrolling said cylindrical configuration to an unrolled configuration; applying a liquid adhesive through said hole and onto said image in said unrolled configuration; engaging said image with said liquid adhesive thereon against said inner surface; and manually smoothing said image into conformity with said inner surface using a flexible brush inserted into said interior volume through said hole.

* * * * *